United States Patent [19]
Michaels

[11] Patent Number: 5,938,928
[45] Date of Patent: *Aug. 17, 1999

[54] OSMOTIC DISTILLATION PROCESS USING A MEMBRANE LAMINATE

[75] Inventor: Alan Sherman Michaels, Chestnut Hill, Mass.

[73] Assignee: Nonap Pty. Ltd., Victoria, Australia

[*] Notice: This patent issued on a continued prosecution application filed under 37 CFR 1.53(d), and is subject to the twenty year patent term provisions of 35 U.S.C. 154(a)(2).

[21] Appl. No.: 08/933,148

[22] Filed: Sep. 18, 1997

Related U.S. Application Data

[62] Continuation of application No. 08/682,406, Jul. 17, 1996, abandoned, which is a continuation of application No. 08/196,204, filed as application No. PCT/AU92/00396, Jul. 31, 1992, abandoned.

[30] Foreign Application Priority Data

Aug. 1, 1991 [AU] Australia ............................... PK7553

[51] Int. Cl.⁶ ........................... B01D 61/36; B01D 61/00
[52] U.S. Cl. ........................... 210/634; 210/640; 210/642
[58] Field of Search .................................... 210/634, 640, 210/641, 642, 644, 645, 649, 490, 650, 651, 652; 203/12, 18, 19, 40, 42, 43

[56] References Cited

U.S. PATENT DOCUMENTS

| | | | |
|---|---|---|---|
| 1,765,667 | 6/1930 | Gusmer | 426/592 |
| 2,611,490 | 9/1952 | Robinson . | |
| 3,186,917 | 6/1965 | Gerhardt et al. . | |
| 3,291,613 | 12/1966 | Raible . | |
| 3,335,545 | 8/1967 | Robb et al. . | |
| 3,425,839 | 2/1969 | Pinnegar | 426/16 |
| 3,502,651 | 3/1970 | Oldenburg | 260/234 |
| 3,552,574 | 1/1971 | Lowe et al. | 210/353 |
| 3,721,621 | 3/1973 | Hough et al. | 210/22 |
| 3,847,163 | 11/1974 | Molyneux | 131/143 |
| 3,865,960 | 2/1975 | Wucherpfennig et al. | 426/239 |
| 3,865,961 | 2/1975 | Wucherpfennig et al. | 426/239 |
| 3,915,820 | 10/1975 | Ito et al. | 204/149 |
| 3,956,112 | 5/1976 | Lee et al. . | |
| 4,015,020 | 3/1977 | Nagasawa et al. | 426/239 |
| 4,083,904 | 4/1978 | Sano et al. | 264/41 |
| 4,187,390 | 2/1980 | Gore | 174/102 R |
| 4,218,312 | 8/1980 | Perry . | |
| 4,265,713 | 5/1981 | Cheng | 203/10 |
| 4,268,279 | 5/1981 | Shindo et al. . | |
| 4,316,772 | 2/1982 | Cheng et al. | 202/163 |
| 4,401,678 | 8/1983 | Beaumont . | |
| 4,419,187 | 12/1983 | Cheng et al. | 202/200 |
| 4,419,242 | 12/1983 | Cheng et al. | 210/500.21 |
| 4,499,117 | 2/1985 | Bonneau | 526/592 |
| 4,532,140 | 7/1985 | Bonnome | 426/13 |
| 4,539,117 | 9/1985 | Meyer et al. | 210/639 |
| 4,581,236 | 4/1986 | Bandel et al. | 426/14 |
| 4,610,791 | 9/1986 | Henne et al. | 210/490 |
| 4,610,887 | 9/1986 | Galzy et al. | 426/490 |

(List continued on next page.)

FOREIGN PATENT DOCUMENTS

| | | |
|---|---|---|
| 33543/68 | 8/1972 | Australia . |
| 0 394 193 | 10/1990 | European Pat. Off. . |
| 0 401 486 | 12/1990 | European Pat. Off. . |
| 0 456 939 | 11/1991 | European Pat. Off. . |
| 2944499 | 5/1981 | Germany . |
| 4109080 | 11/1992 | Germany . |
| 53-024568 | 3/1978 | Japan . |
| 58-78578 | 5/1983 | Japan . |
| 64-23882 | 1/1989 | Japan . |
| 3-30663 | 2/1991 | Japan . |
| 3-89922 | 4/1991 | Japan . |
| 1777126 | 1/1970 | United Kingdom . |
| 1447505 | 8/1976 | United Kingdom . |
| 2054644 | 2/1981 | United Kingdom . |
| 1079517 | 8/1987 | United Kingdom . |
| WO 85/00532 | 2/1985 | WIPO . |
| WO 87/02380 | 4/1987 | WIPO . |
| WO 87/06850 | 11/1987 | WIPO . |
| WO 88/05768 | 8/1988 | WIPO . |
| WO 92/04109 | 3/1992 | WIPO . |
| WO 93/0825 | 4/1993 | WIPO . |

OTHER PUBLICATIONS

Braatz, J.A.., "Biocompatible Polyurethane–Based Hydrogel", *J. Biomaterials Applications*, 1994, 9, 71–96.

Michaels, A.S. et al., "Membrane Permeation: Theory and Practice", *Progress in Separation and Purification*, Perry, E.S., Ed., 1968, vol. 1, John Wiley & Sons, Inc., New York, 143–186.

Excerpt from a Ph.D. dissertation of 1988 by Dr. Antonios Franken of the Netherlands.

*Primary Examiner*—John Kim
*Attorney, Agent, or Firm*—Woodcock Washburn Kurtz Mackiewicz & Norris LLP

[57] ABSTRACT

An osmotic concentration process for selectively extracting one or more volatile components from other components in a liquid mixture across a membrane structure which includes a semipermeable barrier film attached to a non-liquid-wettable microporous membrane is disclosed. The process includes the steps of:

(a) contacting the liquid mixture with a surface of the semipermeable barrier film;

(b) contacting a surface of the non-liquid-wettable microporous membrane with an extracting liquid in which one or more volatile components is soluble; and (c) collecting the remaining liquid mixture. As a result of the process the volatile component or components are extracted from the liquid mixture, passed through the membrane structure in a vapor phase and are dissolved in the extracting liquid. Also disclosed is a membrane arrangement for use in osmotic concentration of aqueous solution such as juice and other beverages, is constituted by a water-permeable sheet attached to a non-water-wettable microporous membrane. Preferably, the structure is in the form of a laminate in which the sheet is laid upon or bounded to the membrane.

22 Claims, No Drawings

U.S. PATENT DOCUMENTS

| | | | |
|---|---|---|---|
| 4,612,196 | 9/1986 | Goldstein et al. | 426/14 |
| 4,617,127 | 10/1986 | Light | 210/651 |
| 4,655,927 | 4/1987 | Ford | 210/639 |
| 4,728,431 | 3/1988 | Nagura et al. | 210/640 |
| 4,743,378 | 5/1988 | Ford | 210/640 |
| 4,778,688 | 10/1988 | Matson | 426/425 |
| 4,952,751 | 8/1990 | Blume et al. | 585/818 |
| 4,960,520 | 10/1990 | Semmens | 210/640 |
| 4,963,381 | 10/1990 | Girard et al. | 426/490 |
| 4,983,303 | 1/1991 | Uragami | 210/640 |
| 4,988,525 | 1/1991 | Gresch | 210/641 |
| 5,066,403 | 11/1991 | Dutta et al. | 210/638 |
| 5,076,932 | 12/1991 | Taylor | 210/640 |
| 5,098,566 | 3/1992 | Lefebvre | 210/640 |
| 5,102,550 | 4/1992 | Pizzino et al. | 210/640 |
| 5,143,526 | 9/1992 | Lee et al. | 210/195.2 |
| 5,281,430 | 1/1994 | Herron et al. | 210/644 |
| 5,382,364 | 1/1995 | Bowser et al. | 210/640 |
| 5,382,365 | 1/1995 | Deblay | 210/644 |
| 5,510,125 | 4/1996 | Gresch | 426/13 |
| 5,512,180 | 4/1996 | Ho | 210/643 |
| 5,552,053 | 9/1996 | Ho et al. | 210/640 |
| 5,582,735 | 12/1996 | Mancusi, III et al. | 210/640 |

OSMOTIC DISTILLATION PROCESS USING A MEMBRANE LAMINATE

This is a continuation, of application Ser. No. 08/682.406, filed Jul. 17, 1996.

This is a continuation of U.S. application Ser. No. 08/196,204, filed as PCT/AU92/00396 Jul. 31, 1992, now abandoned.

FIELD OF THE INVENTION

This invention relates to a membrane arrangement and its use in the osmotic concentration of aqueous solutions.

One preferred use for osmotic concentration of aqueous solutions is in the concentration of juices and beverages.

BACKGROUND OF THE INVENTION

A desirable membrane structure for use in the osmotic concentration of aqueous solutions via osmotic transfer of water to concentrated aqueous saline solutions, is a microporous, non-water-wettable membrane, contacted on its opposite surfaces by the solution to be concentrated and the brine into which the water is to be transferred. The membrane operates such that the pores thereof are filled only with water vapor, and water transport occurs only by molecular transport through the vapor phase. Membranes of such properties are well-known to those skilled in the membrane art, and include microporous structures fabricated from poly tetrafluorethylene, for example GORE-TEX (trade mark of W. L. Gore & Associates, Inc.), from polypropylene, for example CELGARD (Registered Trade Mark), ACCUREL (Registered Trade Mark) and the like.

In many instances, however, the proper functioning of such a membrane is prevented by the presence of contaminants or other components of the feed liquid which promote wetting of the membrane by that solution, and the subsequent penetration of the membrane pores by the wetting liquid. In such a situation, there may be leakage of the feed liquid into the brine-compartment, or of brine into the feed liquid.

Contaminants or other components present in the feed liquid which are likely to cause this problem include emulsified oil droplets, colloidal hydrogel particles, proteins and other biological macromolecules, and surface active agents. These components are, for the most part, non-volatile under the conditions of osmotic concentration, with the result that they remain behind in the feed liquid and may preferentially and adversely accumulate at the upstream membrane surface.

Components of solutions used to clean membrane devices often contain surface active agents, and that residual from these solutions, rather than feed components, might also promote membrane wetting.

It is an object of the invention to provide a process utilizing an improved membrane structure.

DESCRIPTION OF THE INVENTION

In one form of the invention, a process is provided for selectively extracting one or more volatile components from other components in a liquid mixture across a membrane structure which includes a semipermeable barrier film attached to a non-liquid-wettable microporous membrane comprising the steps of:

(a) contacting the liquid mixture with a surface of the semipermeable barrier film;
(b) contacting a surface of the non-liquid-wettable microporous membrane with an extracting liquid in which one or more volatile components is soluble; and
(c) collecting the remaining liquid mixture;

whereby the volatile component or components are extracted from the liquid mixture, passed through the membrane structure in a vapor phase and are dissolved In the extracting liquid.

Preferably, the semipermeable barrier film is macrosolute-impermeable and microsolute-permeable. The semipermeable barrier film is semipermeable in that it is permeable to the volatile component or components whose extraction from the liquid mixture is desired and usually also to the solvent, but preferably should be impermeable to all other mixture components. In particular, the film should be impermeable to nonvolatile solutes whose presence in the liquid mixture would promote wetting of the microporous membrane by the liquid in the absence of the film.

Preferably, the semipermeable barrier film forms a laminate with the membrane. Preferably the semipermeable barrier film is a thin film.

Preferably the volatile component to be extracted is water.

Preferably the liquid mixture is an aqueous solution or dispersion. More preferable, it is fruit or vegetable juice.

Preferably the extracting liquid is an aqueous solution of a nonvolatile solute. More preferably, it is an aqueous salt solution or brine.

In a further preferred embodiment, the volatile component is alcohol and the liquid mixture includes water and alcohol. Preferably, the extracting liquid is water or an aqueous solution of a nonvolatile solute. Preferable, the liquid mixture is an alcoholic beverage.

Embodiments of the invention, which may be preferred, will be described in detail hereinafter.

The previously-described problem, of the proper function of the membrane used in osmotic concentration being prevented by wetting of the membrane taking place, is believed to be overcome by the present invention.

As suggested above a barrier film is imposed between the feed liquid and the microporous hydrophobic membrane. The barrier film is substantially freely permeable to water (Fand may be permeable also to other microsolutes present), but which is essentially impermeable to macrosolutes and colloids. If such a barrier were deposited on the feed-liquid side of the membrane, then none of the wettability-altering components of the feed solution would contact the membrane surface, but water transporting across that barrier would be free to evaporate and migrate through the vapor-filled membrane pores and condense in the brine on the opposite surface.

Any (non-volatile) microsolutes, such as sugar, which can migrate Into the barrier layer, will be concentrated at the layer/membrane boundary, and must then migrate by molecular diffusion back through the barrier into the feed solution. In order to minimize the additional resistance to water transport imposed by this back-transport of solutes (so called solute-polarization), it is desirable that this barrier film be as thin as possible, commensurate with the rate of transport of water from the feed liquid into the brine.

In one particular embodiment, the membrane structure could be a laminate comprising the microporous membrane described hereinabove with a thin, hydrophilic gel-type membrane of high intrinsic water-permeability but very low permeability to macrosolutes. One such likely candidate for this laminate is dialysis grade cellophane or CUPROPHAN (Registered Trade Mark) as is used in the fabrication of hemodialyzers. This film might simply be laid on the surface of the microporous membrane, and the assembly mounted in the same module as is currently used for osmotic concentration. Cellophane membranes as thin as 12.5 microns (0.5 mil) are commercially available, and would probably be suitable for this purpose. To be functional for this embodiment, it is essential that the hydrogel-film-side of the laminate be in contact with the feed liquid or solution to be concentrated. Any other hydrophilic polymer film of adequately high intrinsic water permeability and virtual impermeability to macrosolutes and colloids, which can be fabricated in sufficient thinness, is suitable for this purpose, such films including (but not limited to) those comprised of esters and ethers of cellulose; crosslinked gelatin; gelatinized starch; chitin; agar; alginic acid; crosslinked polyacrylamide; poly (hydroxyethyl) methacrylate; crosslinked polyvinyl alcohol; and the like.

In another embodiment, as an alternative to a hydrogel film for fabrication for such a laminate, is an asymmetric, ultramicroporous, water-wettable membrane, such as an ultrafiltration membrane, the pore size of which is too small to admit the objectionable macrosolutes or colloids. In this case also (since such membranes are permeable to microsolutes), the film should be as thin as possible to minimise polarization within the film, and consequent impedance to water transport. A number of commercially available asymmetric ultrafiltration membranes are useful for this purpose, Including (but not limited to) those comprised of cellulose acetate, polyacrylonitrile, Dynel (trade mark), polyearbonate, polyamide, polysulfone, polyolefin, and polyvinylidene difluoride.

Yet another embodiment of such a laminate, involves coating the microporous membrane with a solution of a highly water-permeable polymer in a volatile, non-wetting solvent which, upon evaporation, leaves a very thin (but defect-free) coating of that polymer on the membrane. Once class of polymers useful for this purpose are the hydrophilic thermoplastic polyurethanes, for example, ESTANE (Registered Trade Mark) which are soluble in such solvents as tetrahydrofuran, DMF, and N-methyl pyrrolidone, from which thin films are easily cast.

Other film-forming coating formulations suitable for this purpose include (but are not limited to) (1) aqueous solutions of thermally curable or cross-linkable polymers such as polyvinyl alcohol/glyoxal; ammonium carboxymethylcellulose; zinc ammonium alginate; gelatin/formaldehyde; chitoasan formate; (2) alcohol or acetone solutions of hydroxyethylated for hydroxypropylated cellulose esters or ethers; (3) alcohol solutions of polyhydroxyethyl methacrylate; and the like.

The processes according to the Invention will permit processing of juices and beverages, with or without pulp, and without pretreatment.

The invention is considered to be additionally suitable for the selective removal of volatile organic solutes from aqueous solutions containing such volatile components as ethyl alcohol, and flavor and fragrance components such as aliphatic and aromatic esters, ethers, ketones, other alcohols, and aldehydes, using as the extracting liquid water or an aqueous solution of a salt or other non-volatile solute. If a liquid containing these surface-active components were allowed to contact directly the non-water-wettable membrane, their presence would tend to promote wetting and liquid penetration. On the other hand, if a barrier film the type above described separates the feed liquid from the membrane, then none of the surface active components will be present as a liquid phase in the membrane, and wetting will not occur. This particular situation is likely to be encountered in osmotic concentration of alcoholic beverages, or of fruit or vegetable extracts rich in flavor/fragrance components. So long as the extracting solution into which these volatiles will condense is sufficiently dilute in those volatiles, and or sufficiently rich in salt or other non-volatile solute, that solution will not be capable of wetting the pores of the membrane, and establishing a liquid pathway for transport.

I claim:

1. An osmotic concentration process for selectively extracting one or more volatile components from one or more heat sensitive components in a liquid mixture across a membrane laminate structure which includes a water-insoluble, water absorptive, and water permeable semipermeable barrier film attached to a non-liquid-wettable microporous membrane comprising the steps of:

(a) contacting the liquid mixture with a surface of the semipermeable barrier film;

(b) contacting a surface of the non-liquid-wettable microporous membrane with an extracting liquid in which one or more volatile components is soluble; and (c) collecting the remaining liquid mixture;

whereby one or more volatile components in the liquid mixture passes through the membrane laminate structure in a vapor phase and are dissolved in the extracting liquid and, wherein said contacting steps are performed in the absence of heating.

2. The process of claim 1 wherein the semipermeable barrier film is macrosolute-impermeable and microsolute-permeable.

3. The process of claim 1 wherein the liquid mixture is an aqueous solution or dispersion.

4. The process of claim 3 wherein the volatile component to be extracted is water.

5. The process of claim 4 wherein the semipermeable barrier film is macrosolute-impermeable and microsolute-permeable and the extracting liquid is an aqueous solution of a nonvolatile solute.

6. The process of claim 1 wherein the extracting liquid is an aqueous solution of nonvolatile solute.

7. The process of claim 1 wherein the one or more volatile components to be extracted is water and the other volatile components in the liquid mixture include fragrance and/or flavor components.

8. The process of claim 1 wherein the liquid mixture is an aqueous solution or dispersion, the volatile components to be extracted are fragrance and/or flavor components, and the extracting liquid is water or an aqueous solution of a nonvolatile solute.

9. The process of claim 1 wherein the liquid mixture includes water and alcohol, and the volatile component to be extracted is alcohol.

10. The process of claim 9 wherein the liquid mixture is an alcoholic beverage.

11. The process of claim 9 wherein the extracting liquid is water or an aqueous solution of a nonvolatile solute.

12. The process of any of claims 1, 2, 3, or 9 wherein the extracting liquid is an aqueous salt solution.

13. The process of claim 12 wherein the aqueous salt solution is brine.

14. The process of claims 1 or 2 wherein the liquid mixture is fruit or vegetable juice.

15. The process of claim 14 wherein the extracting liquid is an aqueous salt solution.

16. The process of claim 1 wherein the semipermeable barrier film and the membrane form a laminate in which the semipermeable barrier film is laid upon or bonded to the membrane.

17. The process of claim 16 wherein the semipermeable barrier film is an ultramicroporous, water-wettable, macrosolute-impermeable and microsolute-permeable ultrafiltration membrane.

18. The process of claim 16, wherein the semipermeable barrier film is applied as a coating to a surface of the microporous membrane.

19. The process of claim 1 wherein the semipermeable barrier film consists of a polysaccharide.

20. The process of claim 19 wherein the semipermeable barrier film consists of regenerated cellulose (cellophane), an ether or ester of cellulose, agar or an agar derivative.

21. The process of claim 1 wherein the semipermeable barrier film consists of an hydroxyalkylated acrylate or methacrylate ester, crosslinked poly(vinyl alcohol), or a linear polyurethane.

22. The process of claim 1 wherein the semipermeable barrier film is freely permeable to one or more volatile components to be extracted from the liquid mixture, but is substantially impermeable to all components in the liquid mixture which, in the absence of the semipermeable barrier film, would promote wetting of the microporous membrane by the liquid mixture.

* * * * *